US012643491B2

(12) United States Patent
Kogure et al.

(10) Patent No.: US 12,643,491 B2
(45) Date of Patent: Jun. 2, 2026

(54) WIRE HARNESS INCLUDING HOLDING MEMBER FIXING ELECTRIC WIRE

(71) Applicants: Yazaki Corporation, Tokyo (JP); AISIN CORPORATION, Kariya (JP)

(72) Inventors: Naoto Kogure, Shizuoka (JP); Kyosuke Okuda, Kariya (JP)

(73) Assignee: YAZAKI CORPORATION, Tokyo (JP)

( * ) Notice: Subject to any disclaimer, the term of this patent is extended or adjusted under 35 U.S.C. 154(b) by 286 days.

(21) Appl. No.: 18/158,663

(22) Filed: Jan. 24, 2023

(65) Prior Publication Data

US 2023/0256922 A1     Aug. 17, 2023

(30) Foreign Application Priority Data

Feb. 17, 2022     (JP) ................................. 2022-022663

(51) Int. Cl.
B60R 16/02          (2006.01)
H02G 3/04           (2006.01)
(52) U.S. Cl.
CPC ....... B60R 16/0215 (2013.01); H02G 3/0462 (2013.01)
(58) Field of Classification Search
None
See application file for complete search history.

(56) References Cited

U.S. PATENT DOCUMENTS

| | | | | |
|---|---|---|---|---|
| 6,417,451 B1 * | 7/2002 | Uchiyama | ............ | H02G 3/0481 |
| | | | | 191/23 R |
| 6,570,093 B2 * | 5/2003 | Doshita | ............... | B60R 16/0215 |
| | | | | 174/72 A |
| 6,677,526 B2 * | 1/2004 | Kishizawa | ........... | H02G 3/0481 |
| | | | | 174/72 A |
| 6,857,894 B2 * | 2/2005 | Riku | ........................ | H01R 4/24 |
| | | | | 439/417 |
| 7,201,606 B2 * | 4/2007 | Matsuoka | ............ | H01R 13/506 |
| | | | | 439/499 |

(Continued)

FOREIGN PATENT DOCUMENTS

| | | |
|---|---|---|
| EP | 1 108 621 A2 | 6/2001 |
| EP | 3 093 929 A1 | 11/2016 |

(Continued)

*Primary Examiner* — Rockshana D Chowdhury
*Assistant Examiner* — Douglas R Burtner
(74) *Attorney, Agent, or Firm* — Sughrue Mion, PLLC

(57)          ABSTRACT

A wire harness includes: an electric wire; a leaf spring member; an exterior member; and a protector integrally holding an end portion of the exterior member and a portion of the electric wire and the leaf spring member led out from the end portion of the exterior member. The protector includes a protector main body having a routing space portion in which the electric wire, the leaf spring member, and the exterior member are routed along an axial direction, a lid portion attached to the protector main body to close the routing space portion, a protrusion portion protruding from the protector main body toward the lid portion and sandwiching a part of the electric wire between the protrusion portion and a second fitting stand portion of the lid portion, and a plurality of first protrusions and second protrusions locking the exterior member.

11 Claims, 4 Drawing Sheets

(56) References Cited

U.S. PATENT DOCUMENTS

| | | | | | |
|---|---|---|---|---|---|
| 7,591,665 | B2* | 9/2009 | Nakamura | ......... | H01R 13/5812 |
| | | | | | 439/752 |
| 9,666,989 | B2* | 5/2017 | Horiuchi | ................ | H01R 13/64 |
| 10,038,314 | B2* | 7/2018 | Satou | ................... | H02G 3/0462 |
| 10,811,790 | B2* | 10/2020 | Yamada | .............. | B60R 16/0239 |
| 11,015,740 | B2* | 5/2021 | Nakano | .............. | B60R 16/0215 |
| 11,699,869 | B2* | 7/2023 | Chen | .................... | H01R 13/113 |
| | | | | | 439/852 |
| 11,780,387 | B2* | 10/2023 | Kitahara | .............. | H02G 3/0456 |
| | | | | | 174/72 A |
| 12,255,444 | B2* | 3/2025 | Kogure | ................ | H02G 3/0462 |
| 12,266,897 | B2* | 4/2025 | Takeuchi | ............. | H01R 4/5041 |
| 12,555,987 | B2* | 2/2026 | Kogure | ................ | H02G 3/0437 |
| 2001/0004022 | A1* | 6/2001 | Kobayashi | .......... | B60R 16/0207 |
| | | | | | 174/72 A |
| 2011/0147078 | A1* | 6/2011 | Satou | .................... | B60R 16/027 |
| | | | | | 174/72 A |
| 2013/0146354 | A1* | 6/2013 | Shimada | ................ | H01B 17/38 |
| | | | | | 174/72 A |
| 2014/0202756 | A1* | 7/2014 | Adachi | ................ | H05K 9/0007 |
| | | | | | 174/72 A |
| 2014/0202763 | A1* | 7/2014 | Adachi | .................... | H02H 3/02 |
| | | | | | 174/72 A |
| 2014/0251681 | A1* | 9/2014 | Adachi | ................ | H02G 3/0481 |
| | | | | | 174/72 A |
| 2015/0136478 | A1* | 5/2015 | Biesse | .................... | B64C 1/406 |
| | | | | | 174/72 A |
| 2015/0329069 | A1* | 11/2015 | Daugherty | ......... | B60R 16/0207 |
| | | | | | 174/72 A |
| 2017/0146124 | A1* | 5/2017 | Daino | ....................... | E06B 5/10 |
| 2018/0001849 | A1* | 1/2018 | Abe | ...................... | B60R 16/023 |
| 2020/0139906 | A1* | 5/2020 | Mizuno | .................. | F16B 19/00 |
| 2020/0141518 | A1* | 5/2020 | Nakano | ................. | H02G 3/30 |
| 2020/0180527 | A1* | 6/2020 | Nishimura | ............... | H02G 3/30 |
| 2023/0275410 | A1* | 8/2023 | Cianciolo | ............. | H02G 3/305 |
| | | | | | 248/548 |
| 2024/0025357 | A1* | 1/2024 | Takaki | ................... | B60R 16/02 |
| 2024/0300422 | A1* | 9/2024 | Oishi | ....................... | F16B 5/06 |
| 2024/0372345 | A1* | 11/2024 | Izawa | .................. | H02G 3/0481 |
| 2025/0100484 | A1* | 3/2025 | Tomosada | .......... | B60R 16/0215 |
| 2025/0105552 | A1* | 3/2025 | Osawa | ................. | H01R 13/582 |
| 2025/0140440 | A1* | 5/2025 | Uno | ...................... | H02G 3/0468 |
| 2025/0153662 | A1* | 5/2025 | Tomosada | .............. | B60J 7/0573 |
| 2025/0153663 | A1* | 5/2025 | Tomosada | .......... | B60R 16/0215 |

FOREIGN PATENT DOCUMENTS

| | | |
|---|---|---|
| EP | 3 623 225 A1 | 3/2020 |
| EP | 3 628 543 A1 | 4/2020 |
| JP | 2003153411 A | 5/2003 |
| JP | 2010-057317 A | 3/2010 |
| JP | 2010057323 A | 3/2010 |
| JP | 2016178850 A | 10/2016 |

* cited by examiner

WIRE HARNESS INCLUDING HOLDING MEMBER FIXING ELECTRIC WIRE

CROSS-REFERENCE TO RELATED APPLICATION(S)

The present application claims priority to and incorporates by reference the entire contents of Japanese Patent Application No. 2022-022663 filed in Japan on Feb. 17, 2022.

BACKGROUND OF THE INVENTION

1. Field of the Invention

The present invention relates to a wire harness.

2. Description of the Related Art

For example, electric power is supplied to electric components such as a sunroof and a slide door of an automobile through a wire harness. Japanese Patent Application Laid-open No. 2010-57317A describes a technique of providing a protector (holding member), an electric wire, and a leaf spring as a routing structure of a wire harness, and fixing the electric wire to the protector together with the leaf spring using a tie band.

In the conventional configuration, for example, a tie band is used to fix the electric wire, the leaf spring, and the protector, and in a case where the electric wire and the exterior member are fixed, an end portion of the exterior member and the electric wire exposed from the end portion may be wound with an adhesive tape, and in a case where the leaf spring and the protector are fixed, the leaf spring may be fixed by providing a concave portion in the protector. In the conventional configuration, for example, since a fixing method is determined for each component, a work space is required for each fixing method, and there is a problem that the work becomes complicated.

SUMMARY OF THE INVENTION

The present invention has been made in view of the above, and the object is to provide a wire harness capable of simplifying a work of fixing an electric wire, a leaf spring member, and an exterior member to a protector.

In order to achieve the above mentioned object, a wire harness according to one aspect of the present invention includes an electric wire having flexibility; a leaf spring member extending along the electric wire, regulating a path of the electric wire, and having elasticity; an exterior member into which the electric wire and the leaf spring member are inserted, the exterior member having flexibility; and a holding member integrally holding an end portion of the exterior member and a portion of the electric wire and the leaf spring member led out from the end portion of the exterior member, wherein the holding member includes a main body having a routing space portion in which the electric wire, the leaf spring member, and the exterior member are routed along an axial direction, a lid portion attached to the main body to close the routing space portion, a protrusion portion protruding from one of the main body and the lid portion toward the other of the main body and the lid portion and sandwiching a part of the electric wire between the protrusion portion and the other of the main body and the lid portion, and a plurality of protrusions protruding from one of the main body and the lid portion toward the other of the main body and the lid portion and locking the exterior member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Note that the present invention is not limited by the embodiment. In addition, constituent elements in the following embodiments include those that can be easily replaced by those skilled in the art or those that are substantially the same.

EMBODIMENT

Figure 1:
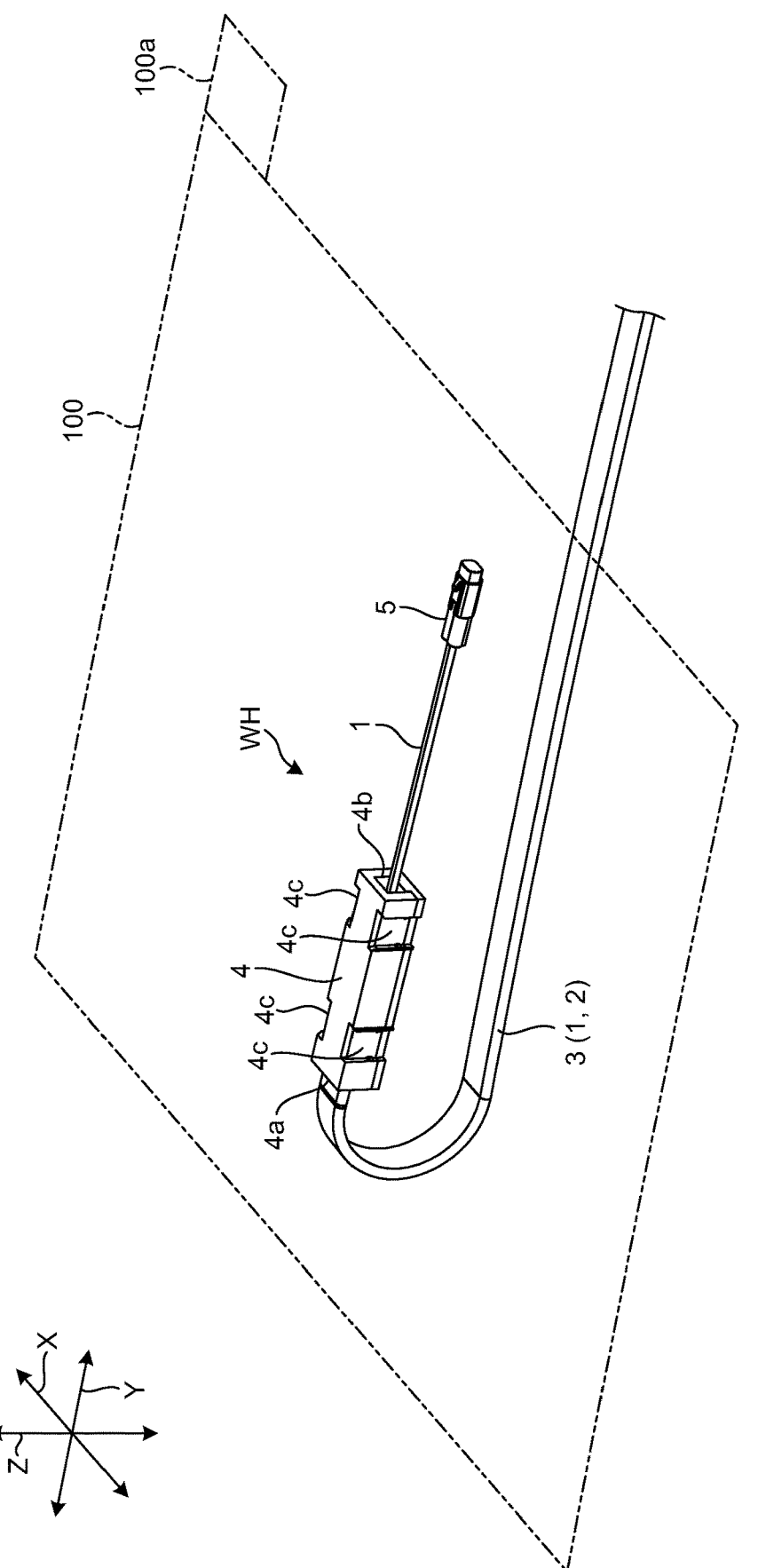
FIG. 1 is a perspective view schematically illustrating a sunroof of an automobile on which a wire harness according to an embodiment is disposed.
Figure 2:
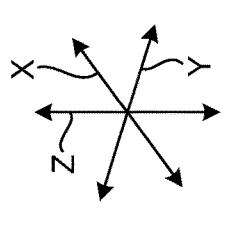
FIG. 2 is an exploded perspective view of the wire harness.
Figure 3:
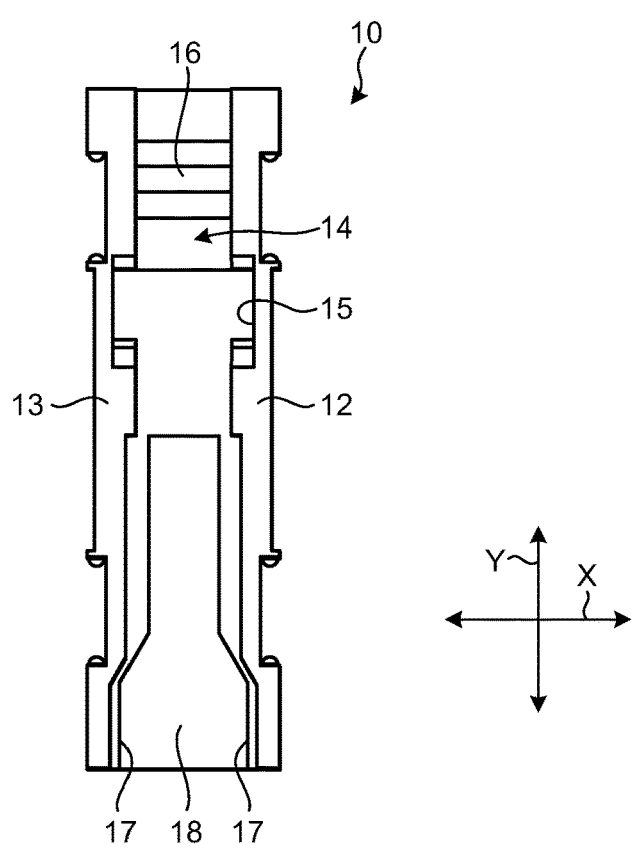
FIG. 3 is a plan view of a protector main body of the wire harness.
Figure 4:
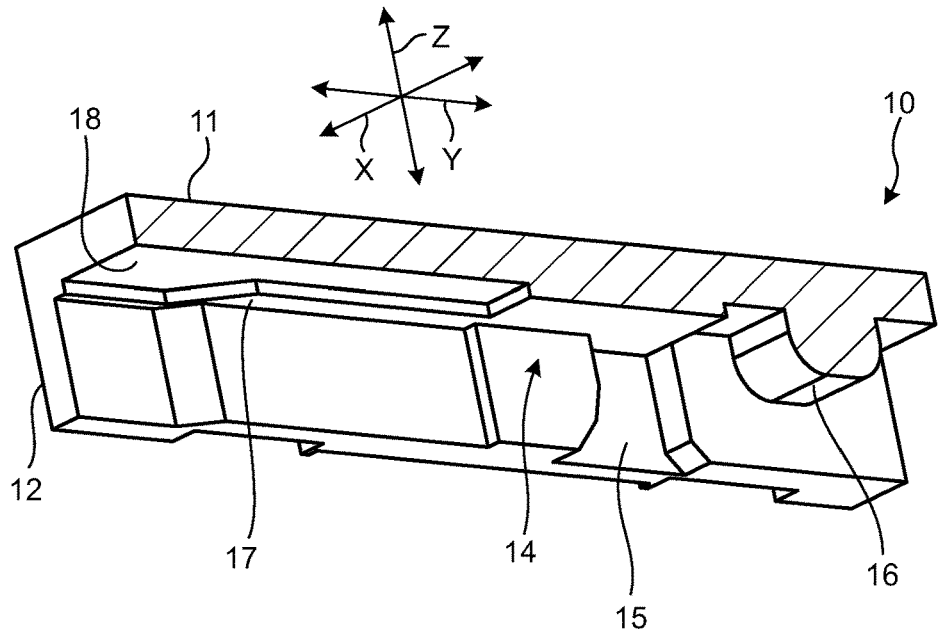
FIG. 4 is a cross-sectional perspective view of the protector main body illustrated in FIG. 3.
Figure 5:
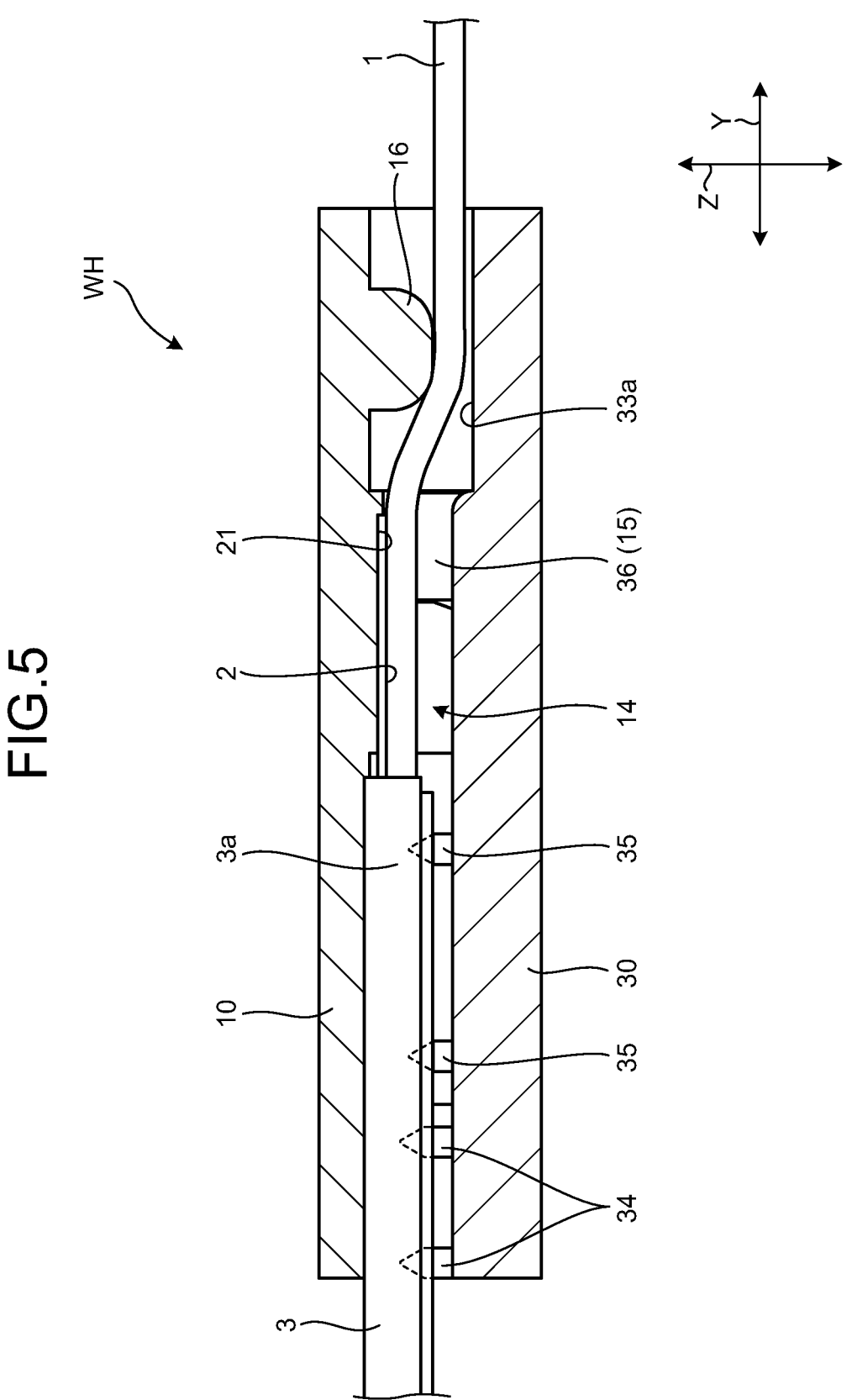
FIG. 5 is an assembled sectional view of the wire harness.

FIG. 1 is a perspective view schematically illustrating a sunroof of an automobile on which a wire harness according to an embodiment is disposed. FIG. 2 is an exploded perspective view of the wire harness according to an embodiment. FIG. 3 is a plan view of a protector main body of the wire harness. FIG. 4 is a cross-sectional perspective view of the protector main body illustrated in FIG. 3. FIG. 5 is an assembled sectional view of the wire harness.

As illustrated in FIG. 1, a wire harness WH of the present embodiment electrically connects, for example, a vehicle body side of the vehicle and a sunroof (glass window) 100, and is used for power supply and signal communication. The sunroof 100 is a moving body that is mounted on a ceiling portion of a vehicle body and slides electrically with respect to the vehicle body. The sunroof 100 includes an electric device 100*a* such as a switch or a motor operated by electric power supplied from a battery of the vehicle. As illustrated in FIGS. 1 and 2, the wire harness WH includes an electric wire 1, a leaf spring member 2, an exterior member 3, a protector (holding member) 4, and a connector 5. In the present embodiment, the protector 4 of the wire harness WH is attached to the sunroof 100 by, for example, engaging claws of a bracket (not illustrated) with engagement grooves 4*c* formed on both side surfaces of the protector 4. In addition, the connector 5 provided at the end portion of the electric wire 1 led out from the protector 4 is coupled to the mating connector and connected to the electric device 100*a*.

Note that, in the following description, among the first direction, the second direction, and the third direction intersecting each other, the first direction is referred to as a "width direction X", the second direction is referred to as an "axial direction Y", and the third direction is referred to as a "height direction Z" for convenience. The width direction X, the axial direction Y, and the height direction Z are typically orthogonal to (intersect) each other. Here, the axial direction Y corresponds to the sliding movement direction of the sunroof 100 described above, and corresponds to the axial direction of the protector 4 attached to the sunroof 100. The width direction X and the height direction Z correspond to the width direction and the height direction of the protector 4 attached to the sunroof 100. Note that the height direction Z also includes a state in which the protector 4 is upside down.

The electric wire 1 is a conductive member having flexibility. In the electric wire 1, the outer side of a conductor portion (core wire) made of a plurality of conductive metal strands is covered with a covering portion having an insulating property. In the present embodiment, as illustrated in FIG. 2, the wire harness WH includes two electric wires 1.

The leaf spring member 2 is an elastic member formed in a band shape, extends along the electric wire 1, and regulates a path of the electric wire 1.

The exterior member 3 has flexibility. In the present embodiment, the exterior member 3 is formed by knitting insulating fibers into a tubular shape (tube shape), and the cross-sectional shape is, for example, an oval shape. As illustrated in FIG. 2, the electric wire 1 and the leaf spring member 2 are inserted into the exterior member 3. The electric wire 1 and the leaf spring member 2 are inserted into the exterior member 3 together in a state of being overlapped in the height direction Z. The end portions of the electric wire 1 and the leaf spring member 2 are led out from an end portion 3a of the exterior member 3.

An end portion 21 of the leaf spring member 2 has a convex shape protruding in the width direction X intersecting the axial direction Y. Specifically, the leaf spring member 2 has a cutout portion 22 in which both ends in the width direction are partially cut out in the width direction, and the cutout portion 22 forms a convex shape in which the end portion 21 of the leaf spring member 2 relatively protrudes in the width direction X. Note that the end portion 21 of the leaf spring member 2 only needs to have a convex shape relatively protruding in the width direction X, and may have a convex shape with both ends in the width direction protruding in the width direction.

As illustrated in FIG. 1, the protector 4 is made of an insulating synthetic resin and formed in a hollow substantially rectangular tubular shape. In the protector 4, the electric wire 1, the leaf spring member 2, and the exterior member 3 are introduced from a lead-in port 4a provided at one end in the axial direction, and the electric wire 1 is led out from a lead-out port 4b provided at the other end in the axial direction. In the present embodiment, as illustrated in FIG. 2, the protector 4 routes the electric wire 1, the leaf spring member 2, and the exterior member 3, and integrally holds the end portion 3a of the exterior member 3 and the portion of the electric wire 1 and the leaf spring member 2 led out from the end portion 3a of the exterior member 3 inside the protector 4.

The protector 4 includes a protector main body (main body) 10 and a lid portion 30. The protector main body 10 includes a first side surface portion 11, a second side surface portion 12, and a third side surface portion 13. In the example of FIG. 2, the protector main body 10 is formed in a U-shape in which the second side surface portion 12 and the third side surface portion 13 face each other and a surface (lower surface) facing the first side surface portion 11 as an upper surface is opened. The protector main body

10 has a routing space portion 14 formed by the first side surface portion 11, the second side surface portion 12, and the third side surface portion 13, and the routing space portion 14 routes the electric wire 1, the leaf spring member 2, and the exterior member 3 along the axial direction Y. In this case, the electric wire 1 and the leaf spring member 2 are inserted into the exterior member 3 in a state of being overlapped with the electric wire 1 in a manner that the leaf spring member 2 is on the side of the protector main body 10. Therefore, in the exterior member 3, the electric wire 1 is positioned on the side of the lid portion 30.

The lid portion 30 is formed in a plate shape, and in the example of FIG. 2, is attached to a surface (lower surface) facing the first side surface portion 11 of the protector main body 10 to close the routing space portion 14 described above. In the present embodiment, the lid portion 30 is attached to the protector main body 10 by being fitted to the second side surface portion 12 and the third side surface portion 13 of the protector main body 10. The lid portion 30 includes a base portion 31, a first fitting stand portion 32, a second fitting stand portion 33, a plurality of first protrusions 34 and second protrusions 35, and a pair of fitting pieces 36. When the protector main body 10 and the lid portion 30 are fitted, the base portion 31 closes the routing space portion 14 to form the side surface of the protector 4.

The first fitting stand portion 32 and the second fitting stand portion 33 are arranged side by side along the axial direction Y on an upper surface (a surface facing the routing space portion 14 of the protector main body 10) 31a of the base portion 31. The first fitting stand portion 32 is formed on the side of the lead-in port 4a (FIG. 1) in the axial direction Y of the protector 4, and the second fitting stand portion 33 is formed on the side of the lead-out port 4b. The first fitting stand portion 32 and the second fitting stand portion 33 have outer side surfaces having the same shape as the inner side surfaces of the second side surface portion 12 and the third side surface portion 13, and are fitted between the second side surface portion 12 and the third side surface portion 13. In the present embodiment, in a case where the upper surface 31a of the base portion 31 is used as a reference, the upper surface (surface facing the routing space portion 14 of the protector main body 10) 32a of the first fitting stand portion 32 is formed to be higher in height position in the height direction Z than the upper surface (surface facing the routing space portion 14 of the protector main body 10) 33a of the second fitting stand portion 33.

The plurality of first protrusions 34 and the plurality of second protrusions 35 are erected to protrude from the upper surface (the surface facing the routing space portion 14 of the protector main body 10) of the first fitting stand portion 32 toward the protector main body 10. As illustrated in FIG. 5, the first protrusion 34 and the second protrusion 35 are locked with the exterior member 3 through which the routing space portion 14 is routed to fix the exterior member 3 in the protector 4. Specifically, since the exterior member 3 is formed by knitting resin fibers, the distal ends of the first protrusion 34 and the second protrusion 35 pierce (penetrate) the gaps between the stitches of the exterior member 3 to lock the exterior member 3. Note that, in the present embodiment, the exterior member 3 is formed by knitting resin fibers, but may be formed of, for example, a flexible material (synthetic rubber and the like) as long as the material is locked with the distal ends of the first protrusion 34 and the second protrusion 35, or may be locked with the distal ends of the first protrusion 34 and the second protrusion 35 in grooves of a corrugated tube.

In the present embodiment, the first protrusion 34 is formed on the side of the lead-in port 4a in the axial direction Y of the protector 4, and the second protrusion 35 is formed on the center side in the axial direction Y with respect to the first protrusion 34. In addition, the first protrusion 34 is formed on the outer side in the width direction X of the protector 4, and the second protrusion 35 is formed on the center side (inner side) in the width direction X with respect to the first protrusion 34. In addition, in the plurality of first protrusions 34 and the plurality of second protrusions 35, the height position of the distal end with respect to the height direction Z of the protector 4 is different according to the formation position of each protrusion. In the example of FIG. 2, the height positions of the distal ends of the first protrusion 34 and the second protrusion 35 with respect to the height direction Z are different, and for example, in a case where the leaf spring member 2 in which the routing space portion 14 is routed is used as a reference, the height position of the distal end of the first protrusion 34 is lower than that of the second protrusion 35. As described above, the height positions of the distal ends of the plurality of first protrusions 34 and the second protrusions 35 with respect to the height direction Z of the protector 4 are different according to the formation positions of the respective protrusions, and thus, for example, even in a case where an excess portion such as wrinkles or slack is generated in the circumferential direction of the exterior member 3, the respective components can be appropriately assembled. In addition, even in a case where the exterior member 3 is pulled, the first protrusion 34 and the second protrusion 35 having different heights disperse stress and prevent an excessive load from being applied to these protrusions or the exterior member 3.

The pair of fitting pieces 36 is arranged side by side in the width direction X with the first fitting stand portion 32 interposed between, and is erected on the upper surface 31a of the base portion 31. In addition, the pair of fitting pieces 36 is formed on the side of the second fitting stand portion 33 of the first fitting stand portion 32 in the axial direction Y. These fitting pieces 36 are fitted into concave portions 15 formed on each inner surface of the second side surface portion 12 and the third side surface portion 13 of the protector main body 10.

On the other hand, as illustrated in FIGS. 3 and 4, the protector main body 10 includes the concave portion 15, a protrusion portion 16, a regulation portion 17, and a housing concave portion 18 formed on the inner surface exposed to the routing space portion 14. The protrusion portion 16 is formed on the side of the lead-out port 4b (FIG. 1) in the axial direction Y of the protector 4 and protrudes toward the lid portion 30. As illustrated in FIG. 5, the protrusion portion 16 is formed to face an upper surface 33a of the second fitting stand portion 33 of the lid portion 30, and sandwiches a part of the electric wire 1 led out from the end portion 3a of the exterior member 3 and routed in the routing space portion 14 between the protrusion portion 16 and the upper surface 33a of the second fitting stand portion 33.

In the present embodiment, the electric wire 1 is disposed on the side of the lid portion 30 than the leaf spring member 2, and the protrusion portion 16 protrudes from the protector main body 10 toward the lid portion 30. Therefore, in a case where the electric wire 1 is sandwiched between the protrusion portion 16 and the upper surface 33a of the second fitting stand portion 33, the electric wire 1 can be easily separated from the leaf spring member 2. Therefore, for example, it is possible to prevent the electric wire 1 from coming into contact with the end portion of the leaf spring member 2, and it is possible to make the electric wire 1 less likely to be damaged. In addition, as illustrated in FIGS. 4 and 5, the protrusion portion 16 has a curved surface facing the electric wire 1 in the axial cross section. Therefore, in a case where the electric wire 1 is sandwiched between the protrusion portion 16 and the upper surface 33a of the second fitting stand portion 33, it is possible to suppress damaging of the electric wire 1 due to the sandwiching.

As illustrated in FIG. 5, the concave portion 15 is formed between the protrusion portion 16 and the first protrusion 34 and the second protrusion 35 provided on the lid portion 30 in the axial direction Y. The concave portion 15 is formed on each inner surface of the second side surface portion 12 and the third side surface portion 13, and is engaged with the convex end portion 21 of the leaf spring member 2 to position the end portion 21 of the leaf spring member 2 in the axial direction Y. In a case where the wire harness WH is assembled, the electric wire 1 and the leaf spring member 2 inserted into the exterior member 3 are disposed in the routing space portion 14, and the convex end portion 21 of the leaf spring member 2 is engaged with the concave portion 15 of the protector main body 10. As a result, the positioning of the end portion 21 of the leaf spring member 2 in the axial direction Y can be made easy, and the electric wire 1, the leaf spring member 2, and the exterior member 3 can be assembled to the protector main body 10. Further, the pair of fitting pieces 36 provided on the lid portion 30 is fitted into the concave portion 15. As a result, by assembling the lid portion 30 to the protector main body 10, the end portion 21 of the leaf spring member 2 is prevented from being detached from the concave portion 15, and the leaf spring member 2 can be fixed to the protector 4.

As illustrated in FIGS. 3 and 4, the regulation portion 17 supports both end portions in the width direction X of the routed leaf spring member 2 via the exterior member 3, and regulates the height position of the leaf spring member 2 in the protector 4 with respect to the height direction Z. In the present embodiment, as illustrated in FIG. 1, the leaf spring member 2 is curved in a substantially U shape outside the protector 4 together with the electric wire 1 and the exterior member 3. That is, the leaf spring member 2 is folded back in the axial direction Y outside the protector 4 and passes under the protector 4 in the height direction Z. Therefore, a biasing force generated by bending acts on the end portion of the leaf spring member 2, and the leaf spring member 2 in the protector main body 10 (protector 4) is constantly pressed against the regulation portion 17 by the biasing force. As a result, the height position of the leaf spring member 2 in the protector 4 can be set to the position (reference position) of the regulation portion 17.

The housing concave portion 18 is a concave portion that is positioned between the pair of regulation portions 17 and is formed to be separated from the leaf spring member 2 in the height direction Z with respect to the regulation portion 17. According to this, for example, in a case where an excess portion such as wrinkles or slack is generated in the circumferential direction of the exterior member 3, the excess portion is housed in the housing concave portion 18, in a manner that the height position of the leaf spring member 2 can be set to the reference position regardless of the excess portion, and each member can be assembled in an appropriate positional relationship.

The wire harness WH according to the present embodiment includes: the electric wire 1 having flexibility; the leaf spring member 2 extending along the electric wire 1, regulating the path of the electric wire 1, and having elasticity; the exterior member 3 through which the electric wire 1 and the leaf spring member 2 are inserted, the exterior member 3 having flexibility; and the protector 4 integrally holding the end portion 3a of the exterior member 3 and a portion of the electric wire 1 and the leaf spring member 2 led out from the end portion 3a of the exterior member 3. The protector 4 includes the protector main body 10 having the routing space portion 14 in which the electric wire 1, the leaf spring member 2, and the exterior member 3 are routed along the axial direction Y; the lid portion 30 attached to the protector main body 10 to close the routing space portion 14; the protrusion portion 16 protruding from the protector main body 10 toward the lid portion 30 and sandwiching a part of the electric wire 1 between the protrusion portion 16 and the second fitting stand portion 33 of the lid portion 30; and the plurality of first protrusions 34 and the second protrusions 35 protruding from the lid portion 30 toward the protector main body 10 and locking the exterior member 3.

According to this configuration, the electric wire 1 and the exterior member 3 are collectively fixed to the protector 4 by a simple operation of attaching the lid portion 30 to the protector main body 10 in a state where the electric wire 1 and the leaf spring member 2 inserted into the exterior member 3 are disposed in the routing space portion 14. Therefore, the work of fixing the electric wire 1, the leaf spring member 2, and the exterior member 3 to the protector 4 can be simplified.

In addition, in the wire harness WH according to the present embodiment, the leaf spring member 2 is formed in a band shape, and has a convex shape in which the end portion 21 relatively protrudes in the width direction X intersecting the axial direction Y, and in the protector main body 10, the concave portion 15 that engages with the convex end portion 21 of the leaf spring member 2 and positions the end portion 21 of the leaf spring member 2 is formed between the protrusion portion 16 and the first protrusion 34 and the second protrusion 35 in the axial direction Y. According to this configuration, the electric wire 1 and the leaf spring member 2 inserted into the exterior member 3 are disposed in the routing space portion 14, and the convex end portion 21 of the leaf spring member 2 is engaged with the concave portion 15 of the protector main body 10, in a manner that the positioning of the end portion 21 of the leaf spring member 2 can be made easy. Therefore, the electric wire 1, the leaf spring member 2, and the exterior member 3 can be assembled to the protector main body 10.

In addition, in the wire harness WH according to the present embodiment, the exterior member 3 is formed by knitting insulating fibers into a tubular shape, and the exterior member 3 is locked by the distal ends of the plurality of first protrusions 34 and second protrusions 35 being inserted into the gaps of the stitches of the exterior member 3. According to this configuration, the exterior member 3 can be fixed to the protector 4 by a simple operation of attaching the lid portion 30 provided with the plurality of first protrusions 34 and second protrusions 35 to the protector main body 10.

In addition, the protrusion portion 16 is provided on the protector main body 10, and a surface of the protrusion portion 16 facing a part of the electric wire 1 is curved. According to this configuration, in a case where the electric wire 1 is sandwiched between the protrusion portion 16 and the upper surface 33a of the second fitting stand portion 33, the electric wire 1 can be easily separated from the leaf spring member 2. Therefore, for example, it is possible to prevent the electric wire 1 from coming into contact with the end portion 21 of the leaf spring member 2, and it is possible to make the electric wire 1 less likely to be damaged. In addition, since the surface of the protrusion portion 16 facing the electric wire 1 is curved, in a case where the electric wire 1 is sandwiched between the protrusion portion 16 and the upper surface 33a of the second fitting stand portion 33, it is possible to suppress damaging of the electric wire 1 due to the sandwiching.

Note that the wire harness WH according to the embodiment of the present invention described above is not limited to the embodiment described above, and various modifications can be made within the scope described in the claims. For example, in the present embodiment, the protector main body 10 is provided with the protrusion portion 16 that sandwiches a part of the electric wire 1, but the present embodiment is not limited to this, and the protrusion portion 16 may protrude from the lid portion 30 toward the protector main body 10. In addition, although the plurality of first protrusions 34 and the second protrusions 35 for locking the exterior member 3 are provided on the lid portion 30, the first protrusions 34 and the second protrusions 35 may be provided from the protector main body 10 toward the lid portion 30.

In addition, in the present embodiment, the exterior member 3 has been described as being formed by knitting insulating fibers into a tubular shape, but the present invention is not limited to this as long as the exterior member 3 can be locked to the first protrusion 34 and the second protrusion 35, and for example, a rubber-based material having flexibility may be used. In addition, like a corrugated tube, a plurality of groove portions engaged with the distal ends of the protrusions may be provided.

In addition, in the present embodiment, the reference of the height positions of the distal ends of the first protrusion 34 and the second protrusion 35 with respect to the height direction Z is the leaf spring member 2, but the present embodiment is not limited to this, and for example, the upper surface 32a of the first fitting stand portion 32 of the lid portion 30 may be used as the reference. In this case, the height position of the distal end of the first protrusion 34 is higher than the height position of the second protrusion 35.

In addition, in the present embodiment, the sunroof 100 has been described as a moving body provided with the wire harness WH, but it is needless to say that the wire harness WH can be provided on a slide door, for example.

According to the wire harness of the present embodiment, the work of fixing the electric wire, the leaf spring member, and the exterior member to the protector can be simplified.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
an electric wire having flexibility;
a leaf spring member extending along the electric wire, regulating a path of the electric wire, and having elasticity;
an exterior member into which the electric wire and the leaf spring member are inserted, the exterior member having flexibility; and
a holding member integrally holding an end portion of the exterior member and a portion of the electric wire and the leaf spring member led out from the end portion of the exterior member, wherein the holding member includes a main body having a routing space portion in which the electric wire, the leaf spring member, and the exterior member are routed along an axial direction, a lid portion attached to the main body to close the routing space portion, a protrusion portion integrally formed within the routing space portion and comprising a curved surface that faces the electric wire, the protrusion portion protruding from one of the main body and the lid portion toward the other of the main body and the lid portion and sandwiching a part of the electric wire between the protrusion portion and the other of the main body and the lid portion, and a plurality of protrusions integrally formed within the routing space portion and protruding from one of the main body and the lid portion toward the other of the main body and the lid portion, the plurality of protrusions penetrating a surface of the exterior member and locking the exterior member between the plurality of protrusions and the other of the main body and the lid portion.

2. The wire harness according to claim 1, wherein the leaf spring member is formed in a band shape, and has a convex shape in which an end portion of the leaf spring member relatively protrudes in a width direction intersecting the axial direction, and in the main body, a concave portion that engages with an end portion of the convex portion of the leaf spring member and positions the end portion of the leaf spring member is formed between the protrusion portion and the protrusion in the axial direction.

3. The wire harness according to claim 1, wherein the exterior member is formed by knitting insulating fibers into a tubular shape, and the exterior member is locked by the distal ends of the plurality of protrusions being inserted into gaps of stitches of the exterior member.

4. The wire harness according to claim 2, wherein the exterior member is formed by knitting insulating fibers into a tubular shape, and the exterior member is locked by the distal ends of the plurality of protrusions being inserted into gaps of stitches of the exterior member.

5. The wire harness according to claim 1, wherein the protrusion portion is provided on a side of the main body, and a surface of the protrusion portion facing a part of the electric wire is curved.

6. The wire harness according to claim 2, wherein the protrusion portion is provided on a side of the main body, and a surface of the protrusion portion facing a part of the electric wire is curved.

7. The wire harness according to claim 3, wherein the protrusion portion is provided on a side of the main body, and a surface of the protrusion portion facing a part of the electric wire is curved.

8. The wire harness according to claim 4, wherein the protrusion portion is provided on a side of the main body, and a surface of the protrusion portion facing a part of the electric wire is curved.

9. A wire harness comprising:

an electric wire having flexibility;

a leaf spring member extending along the electric wire, regulating a path of the electric wire, and having elasticity;

an exterior member into which the electric wire and the leaf spring member are inserted, the exterior member having flexibility; and a holding member integrally holding an end portion of the exterior member and a portion of the electric wire and the leaf spring member led out from the end portion of the exterior member, wherein the holding member includes a main body having a routing space portion in which the electric wire, the leaf spring member, and the exterior member are routed along an axial direction, a lid portion attached to the main body to close the routing space portion, a protrusion portion protruding from one of the main body and the lid portion toward the other of the main body and the lid portion and sandwiching a part of the electric wire between the protrusion portion and the other of the main body and the lid portion, and a plurality of protrusions protruding from one of the main body and the lid portion toward the other of the main body and the lid portion, the plurality of protrusions penetrating a surface of the exterior member and locking the exterior member, wherein the plurality of protrusions comprise a plurality of first protrusions and a plurality of second protrusions, wherein, with respect to an axial direction, the plurality of first protrusions are positioned at a side of a lead-in port of the holding member, and the plurality of second protrusions are positioned at a center side of the holding member relative to the plurality of first protrusions, and wherein, with respect to a width direction intersecting the axial direction, the plurality of first protrusions are positioned at an outer side, and the plurality of second protrusions are positioned at an inner side relative to the plurality of first protrusions.

10. The wire harness according to claim 9, wherein wherein a height of the plurality of first protrusions is different than a height of the plurality of second protrusions.

11. The wire harness according to claim 1, wherein a height of the plurality of protrusions vary according to respective formation positions of the plurality of protrusions, the height being based on a protrusion length from the one of the main body and the lid portion toward the other of the main body and the lid portion.

* * * * *